United States Patent
Shi

(10) Patent No.: US 12,185,385 B2
(45) Date of Patent: Dec. 31, 2024

(54) METHOD AND DEVICE FOR RANDOM ACCESS

(71) Applicant: GUANGDONG OPPO MOBILE TELECOMMUNICATIONS CORP., LTD., Guangdong (CN)

(72) Inventor: Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 337 days.

(21) Appl. No.: 17/533,752

(22) Filed: Nov. 23, 2021

(65) Prior Publication Data

US 2022/0086921 A1 Mar. 17, 2022

Related U.S. Application Data

(63) Continuation of application No. PCT/CN2019/088418, filed on May 24, 2019.

(51) Int. Cl.
*H04W 24/08* (2009.01)
*H04W 74/0833* (2024.01)
*H04W 76/20* (2018.01)

(52) U.S. Cl.
CPC ....... *H04W 74/0841* (2013.01); *H04W 24/08* (2013.01); *H04W 76/20* (2018.02)

(58) Field of Classification Search
CPC ......... H04W 74/0841; H04W 74/0833; H04W 24/08; H04W 76/20; H04W 76/10; H04W 76/19; H04W 76/28; H04W 52/0216
See application file for complete search history.

(56) References Cited

U.S. PATENT DOCUMENTS

| | | | |
|---|---|---|---|
| 7,430,181 B1 | 9/2008 | Hong | |
| 2013/0182626 A1* | 7/2013 | Kuo | H04W 52/02 370/311 |
| 2017/0339682 A1 | 11/2017 | Lee et al. | |
| 2018/0049272 A1* | 2/2018 | Bagheri | H04W 72/12 |
| 2019/0052413 A1* | 2/2019 | Babaei | H04L 1/1887 |

(Continued)

FOREIGN PATENT DOCUMENTS

| | | |
|---|---|---|
| CN | 105451363 A | 3/2016 |
| CN | 108617003 A | 10/2018 |
| CN | 109392060 A | 2/2019 |
| EP | 3664521 A1 | 6/2020 |
| WO | 2018058408 A1 | 4/2018 |

(Continued)

OTHER PUBLICATIONS

First Office Action of the Chinese application No. 201980088410.7, issued on Aug. 10, 2022 with machine translation by Global Dossier.

(Continued)

*Primary Examiner* — Jae Y Lee
*Assistant Examiner* — Hector Reyes
(74) *Attorney, Agent, or Firm* — Ladas & Parry, LLP

(57) ABSTRACT

A method and device for random access are provided. The method comprises: a terminal device sends a first message in a random access process to a network device; and the terminal device monitors a second message sent by the network device, wherein the second message is a message sent by the network device on the basis of the first message, and the time the terminal device starts to monitor the second message is later than the time the terminal device finishes sending the first message.

15 Claims, 16 Drawing Sheets

(56) References Cited

U.S. PATENT DOCUMENTS

| | | | |
|---|---|---|---|
| 2019/0190661 A1* | 6/2019 | You | H04W 74/0833 |
| 2020/0187245 A1 | 6/2020 | Fujishiro et al. | |
| 2020/0236623 A1 | 7/2020 | Wu | |
| 2020/0275505 A1* | 8/2020 | Lei | H04L 1/1825 |
| 2022/0006514 A1* | 1/2022 | Sedin | H04L 1/1883 |
| 2022/0007455 A1* | 1/2022 | Hong | H04W 76/28 |
| 2023/0319901 A1* | 10/2023 | Ozturk | H04W 74/085 |
| | | | 370/329 |

FOREIGN PATENT DOCUMENTS

| | | | |
|---|---|---|---|
| WO | 2019024790 A1 | 2/2019 | |
| WO | 2019031427 A1 | 2/2019 | |

OTHER PUBLICATIONS

Second Office Action and search report of the corresponding Chinese application No. 201980088410.7, issued on Dec. 26, 2022.

3GPP TSG RAN WG1 Meeting AH1901 R1-1900380, Taipei, Taiwan, Jan. 21-25, 2019, Agenda Item: 7.2.9.2.1, Source: Sony, Title: Power Consumption Adaptation for NR, Document for: Discussion /decision.

3GPP TSG-RAN WG2 Meeting #105bis R2-1903297, Xi' an, China, Apr. 6-Apr. 12, 2019, Agenda Item: 11.11.4.2, Source: OPPO, Title: DCI based power saving adaptation, Document for: Discussion, Decision.

Supplementary European Search Report in the European application No. 19931045.9, mailed on May 3, 2022.

Written Opinion of the International Search Authority in the international application No. PCT/CN2019/088418, mailed on Feb. 26, 2020.

International Preliminary Report on Patentability of the International Search Authority in the international application No. PCT/CN2019/088418, mailed on Nov. 16, 2021.

International Search Report in the international application No. PCT/CN2019/088418, mailed on Feb. 26, 2020.

Written Opinion of the International Searching Authority in the international application No. PCT/CN2019/088418, mailed on Feb. 26, 2020. with English translation provided by Google Translate.

\* cited by examiner

| R | Timing advance | | Layer 1 |
|---|---|---|---|
| Timing advance | | Uplink grant | Layer 2 |
| Uplink grant | | | Layer 3 |
| Uplink grant | | | Layer 4 |
| Uplink grant | | | Layer 5 |
| Temporary C-RNTI | | | Layer 6 |
| Temporary C-RNTI | | | Layer 7 |

FIG. 6

METHOD AND DEVICE FOR RANDOM ACCESS

CROSS-REFERENCE TO RELATED APPLICATION

This application is a continuation of International Application No. PCT/CN2019/088418, filed on May 24, 2019, the contents of which are incorporated herein by reference in their entireties.

BACKGROUND

A terminal device needs to be synchronized with a network device before transmitting Uplink (UL) data to the network device. The terminal device generally may implement UL synchronization by random access.

The terminal device needs to monitor whether the network device replies the terminal device with a message during random access with the network device. However, the network device does not return any message to the terminal device in some time, but the terminal device still monitors messages in this time, which may cause resource waste of the terminal device and is unfavorable for the power saving of the terminal device.

SUMMARY

The application relates to the field of communication, and more particularly, to a method and a device for random access.

The disclosure provides a method for random access and a device, which may save the power of a terminal device.

A first aspect provides a method for random access. The method includes the following operations: a terminal device sends a first message in a random access process to a network device; and the terminal device monitors a second message sent by the network device. The second message is a message sent by the network device based on the first message. The terminal device starts monitoring the second message at a moment later than the moment that the terminal device completes sending the first message.

A second aspect provides a method for random access. The method includes that the following operations: a network device receives a first message sent by a terminal device in a random access process; and the network device determines a sending moment of a second message according to a target timer. The second message is a message sent by the network device in response to the first message. The duration of the target timer is equal to the duration from a moment of completing sending the first message by the terminal device to a moment of starting monitoring the second message by the terminal device.

A third aspect provides a terminal device, which is configured to execute the method in the first aspect or each implementation thereof.

Specifically, the terminal device includes function modules configured to execute the method in the first aspect or each implementation thereof.

A fourth aspect provides a network device, which is configured to execute the method in the second aspect or each implementation thereof.

Specifically, the network device includes function modules configured to execute the method in the second aspect or each implementation thereof.

A fifth aspect provides a terminal device, which includes a processor and a memory. The memory is configured to store a computer program. The processor is configured to call and run the computer program stored in the memory to execute the method in the first aspect or each implementation thereof.

A sixth aspect provides a network device, which includes a processor and a memory. The memory is configured to store a computer program. The processor is configured to call and run the computer program stored in the memory to execute the method in the second aspect or each implementation thereof.

A seventh aspect provides an apparatus, which is configured to implement the method in any one of the first aspect to the second aspect or each implementation thereof.

Specifically, the apparatus includes a processor. The processor is configured to call and run a computer program in a memory to enable a device with the apparatus to execute the method in any one of the first aspect to the second aspect or each implementation thereof.

An eighth aspect provides a computer-readable storage medium, configured to store a computer program which enables a computer to execute the method in any one of the first aspect to the second aspect or each implementation thereof.

A ninth aspect provides a computer program product, including a computer program instruction which enables a computer to execute the method in any one of the first aspect to the second aspect or each implementation thereof.

A tenth aspect provides a computer program, which, when running in a computer, causes the computer to execute the method in any one of the first aspect to the second aspect or each implementation thereof.

According to the technical solutions provided in the disclosure, the terminal device, after completing sending the first message in the random access process to the network device, cannot immediately receive the second message returned by the network device due to a signal transmission delay and the processing time of the network device. Therefore, after completing sending the first message, the terminal device takes a time interval before starting monitoring the second message rather than immediately starts monitoring the second message returned by the network device. As such, the power of the terminal device may be saved.

BRIEF DESCRIPTION OF THE DRAWINGS

FIG. 6 is a structural schematic diagram of another RAR format according to an embodiment of the disclosure.

DETAILED DESCRIPTION

Figure 1:
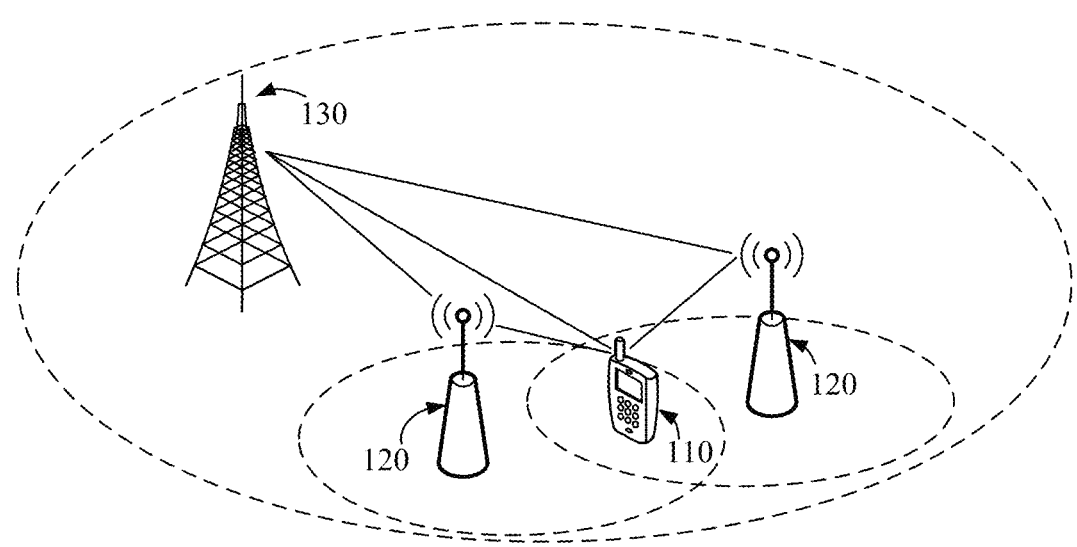
FIG. 1 is a schematic diagram of a wireless communication system applied in the embodiments of the disclosure.

FIG. 1 is a schematic diagram of a system 100 according to an embodiment of the disclosure.

As illustrated in FIG. 1, a terminal device 110 is connected with a first network device 130 in a first communication system and a second network device 120 in a second communication system. For example, the first network device 130 is a Long Term Evolution (LTE) network device, and the second network device 120 is a New Radio (NR) network device.

The first network device 130 and the second network device 120 may include multiple cells.

It is to be understood that FIG. 1 is an example of a communication system of the embodiments of the disclosure. The embodiments of the disclosure are not limited to FIG. 1.

As an example, the communication system applied in the embodiments of the disclosure may include at least multiple network devices in the first communication system and/or multiple network devices in the second communication system.

For example, the system 100 illustrated in FIG. 1 may include a primary network device in the first communication system and at least one secondary network device in the second communication system. The at least one secondary network device is connected with the primary network device respectively to form multiple connections, and is connected with the terminal devices 110 respectively to provide service for the terminal devices. Specifically, the terminal device 110 may establish connections with the primary network device and the secondary network device simultaneously.

Optionally, the connection established between the terminal device 110 and the primary network device is a primary connection, and the connection established between the terminal device 110 and the secondary network device is a secondary connection. Control signaling of the terminal device 110 may be transmitted through the primary connection, and data of the terminal device 110 may be transmitted through the primary connection and the secondary connection simultaneously and may also be transmitted through the secondary connection only.

As another example, in the embodiment of the disclosure, the first communication system and the second communication system are different, but specific types of the first communication system and the second communication system are not limited.

For example, the first communication system and the second communication system may be various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, LTE Time Division Duplex (TDD), and a Universal Mobile Telecommunication System (UMTS), etc.

The primary network device and the secondary network device may be any access network devices.

Optionally, in some embodiments, the access network device may be a Base Transceiver Station (BTS) in the GSM or the CDMA system, or may be a NodeB (NB) in the WCDMA system, or may be an Evolutional Node B (eNB or eNodeB) in the LTE system.

Optionally, the access network device may be a base station (gNB) in a Next Generation Radio Access Network (NG RAN) or an NR system or a wireless controller in a Cloud Radio Access Network (CRAN). Alternatively, the access network device may be a relay station, an access point, a vehicle device, a wearable device, a network device in a future evolved Public Land Mobile Network (PLMN), or the like.

In the system 100 illustrated in FIG. 1, for example, the first network device 130 is a primary network device, and the second network device 120 is a secondary network device.

The first network device 130 may be an LTE network device, and the second network device 120 may be an NR network device. Alternatively, the first network device 130 may be an NR network device, and the second network device 120 may be an LTE network device. Alternatively, both the first network device 130 and the second network device 120 may be NR network devices. Alternatively, the first network device 130 may be a GSM network device, a CDMA network device, etc., and the second network device 120 may also be a GSM network device, a CDMA network device, etc. Alternatively, the first network device 130 may be a Macrocell, and the second network device may be a Microcell, a Picocell, a Femtocell, etc.

Optionally, the terminal device 110 may be any terminal device. The terminal device 110 includes, but not limited to:
a device connected through a wired line (for example, through Public Switched Telephone Network (PSTN), Digital Subscriber Line (DSL), digital cable and direct cable connections), and/or another data connection/network, and/or through a wireless interface (for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter), and/or another communication terminal configured to receive/send a communication signal; and/or an Internet of Things (IoT) device. The terminal device configured to communicate through a wireless interface may be called a "wireless communication terminal", a "wireless terminal", or a "mobile terminal." Examples of the mobile terminal include, but not limited to, a satellite or cellular telephone; a Personal Communication System (PCS) terminal capable of combining a cellular radio telephone and data processing, faxing and data communication function; a Personal Digital Assistant (PDA) capable of including a radio telephone, a pager, Internet/intranet access, a Web browser, a notepad, a calendar and/or a Global Positioning System (GPS) receiver; and a conventional laptop and/or palmtop receiver or other electronic devices including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent, or a user apparatus. The access terminal may be a cell phone, a cordless phone, a Session Initiation Protocol (SIP) phone, a Wireless Local Loop (WLL) station, a PDA, a handheld device with a wireless communication function, a computing device, other processing devices connected to a wireless modem, a vehicle device, a wearable device, a terminal device in a 5th-Generation (5G) network, a terminal device in the future evolved PLMN, or the like.

It is to be understood that terms "system" and "network" in the disclosure may usually be interchanged in the disclosure.

The terminal device may usually perform UL transmission only after synchronized with the network device through a random access process.

There are various events that trigger the terminal device to perform random access, which are not specifically limited by the embodiments of the disclosure.

For example, the events triggering the terminal device to perform random access include at least one of:
1: initial establishment of a wireless connection: the terminal device is switched from a Radio Resource Control (RRC) idle state to an RRC connected state;
2: an RRC connection reestablishment process;
3: handover: the terminal device needs to complete handover through a random access process when the terminal device performs cell handover;
4: the terminal device is in the RRC connected state but out of UL synchrony and the downlink data arrives;
5: in the RRC connected state, the uplink data arrives but out of UL synchrony;
6: in the RRC connected state, the uplink data arrives, but there is no available Scheduling Request (SR) resource in a Physical Uplink Control Channel (PUCCH);
7: an SR failure;
8: an RRC synchronization reconfiguration request;
9: switching from an RRC inactive state to the RRC connected state;
10: creating time alignment when the secondary cell is added;
11: a request for other System Information (SI); and
12: beam failure recovery.

Taking an NR system as an example, the NR system presently supports two random access manners, i.e., contention-based random access and contention-free random access. Contention-based random access may also be called four-step random access.

A contention-based random access process will now be described in combination with FIG. 2. The method illustrated in FIG. 2 includes steps S210 to S240.

In S210, a terminal device selects a Physical Random Access Channel (PRACH) resource, e.g., at least one of: a time-domain resource, frequency-domain resource or code-domain resource of a PRACH.

The terminal device sends a Message 1 (MSG1) to a network device on the selected PRACH resource. The MSG1 includes a random access preamble selected by the terminal device.

The network device may estimate UL transmission time and a size of a UL resource required by sending a Message 3 (MSG3) by the terminal device in S230 according to the preamble sent by the terminal device.

In S220, a network device sends a Message 2 (MSG2) in a Downlink Shared Channel (DL-SCH) after receiving MSG1. The MSG2 is an RAR.

The RAR contains a Timing Advance (TA) for UL transmission and available UL resource information as well as a Temporary Cell Radio Network Temporary Identifier (T-CRNTI) (i.e., a temporary Cell Radio Network Temporary Identifier (CRNTI)).

Optionally, the RAR may be generated by a MAC layer of the network device. The RAR generated by the MAC layer may also be referred to as a MAC RAR. One MSG2 may correspond to random access request responses of multiple terminal devices simultaneously.

For the terminal device, the terminal device, after sending the MSG1, may enable an RAR window and monitor a Physical Downlink Control Channel (PDCCH) in the RAR window.

The PDCCH is a PDCCH scrambled by a Random Access Radio Network Temporary Identifier (RA-RNTI). The RA-RNTI is calculated as follows:

$$RA - RNTI = 1 + s\_id + 14 \times t\_id + \\ 14 \times 80 \times f\_id + 14 \times 80 \times 8 \times ul\_carrier\_id. \quad \text{(formula 1)}$$

Herein, s_id represents an index of a first Orthogonal Frequency Division Multiplexing (OFDM) symbol of the PRACH resource, and 0≥s_id<14. t_id represents an index of a first slot of the PRACH resource in a system frame, and 0≥t_id<80. f_id represents an index of a PRACH occasion in a frequency domain, and 0≥f_id<8. ul_carrier_id represents a UL carrier type for the transmission of the random access preamble (0 represents a UL carrier and 1 represents a complementary UL carrier).

From the above, it can be seen that the RA-RNTI is related to a time-frequency resource of the PRACH selected by the terminal device. Both the terminal device and the network device may determine the RA-RNTI according to the time-frequency resource of the PRACH. The network device may scramble the PDCCH according to the determined RA-RNTI and send the scrambled PDCCH to the terminal device. The terminal device may decode the PDCCH sent by the network device according to the determined RA-RNTI.

The terminal device obtains a Physical Downlink Shared Channel (PDSCH) scheduled by the PDCCH according to the PDCCH after successfully monitoring the PDCCH scrambled by the RA-RNTI. The PDSCH may include the RAR. A format of the RAR may be as illustrated in FIG. 3 to FIG. 6.

A MAC RAR may be born in a MAC PDU. A MAC PDU may structurally include three parts. One part is a MAC header, and a size of the MAC header is variable. One part is an RAR load, and the RAR load may include one or more MAC RARs. The other part is padding information, and the padding information is optional.

Figure 3:
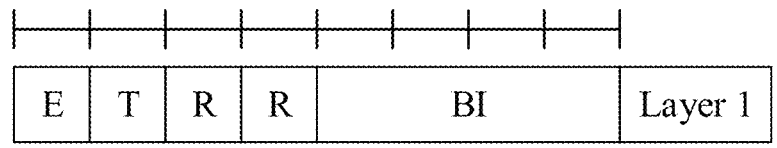
FIG. 3 is a structural schematic diagram of a Random Access Response (RAR) format according to an embodiment of the disclosure.
Figure 4:
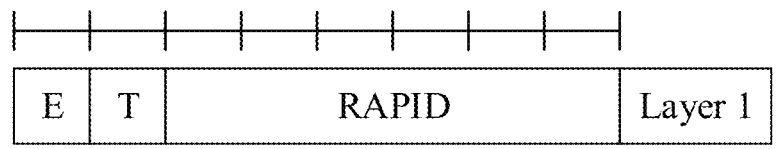
FIG. 4 is a structural schematic diagram of another RAR format according to an embodiment of the disclosure.

A MAC header may include one or more MAC subheaders. A MAC header may include two types of subheaders, as illustrated in FIGS. 3 and 4. FIGS. 3 and 4 are structure schematic diagrams of two types of MAC subheaders. The two types of subheaders may be distinguished by a type field "T". T=0 may be configured to indicate that a random access Backoff Indicator (BI) is to be presented next, as illustrated in FIG. 3. The BI may be configured to indicate backoff time for the retransmission of the MSG1. T=1 may indicate that a Random Access Preamble Identity (RAPID) is to be presented next, as illustrated in FIG. 4.

In MAC subheader fields, field "E" represents an extension field configured to indicate whether there is a subsequent MAC subheader. E=1 indicates that there is a subsequent MAC subheader. E=0 indicates that there is no subsequent MAC subheader. Field "T" represents a type field configured to indicate whether the "BI" or the "RAPID" is to be presented next. T=1 indicates that field RAPID is to be presented next. T=0 indicates that field BI is to be presented next. The RAPID is a response of the network device to the preamble in the received MSG1. A value of the RAPID may be a value of the preamble sent to the network device by the terminal device. Field "BI" represents the backoff indicator and is configured to indicate the backoff time for the retransmission of the MSG1.

Figure 5:
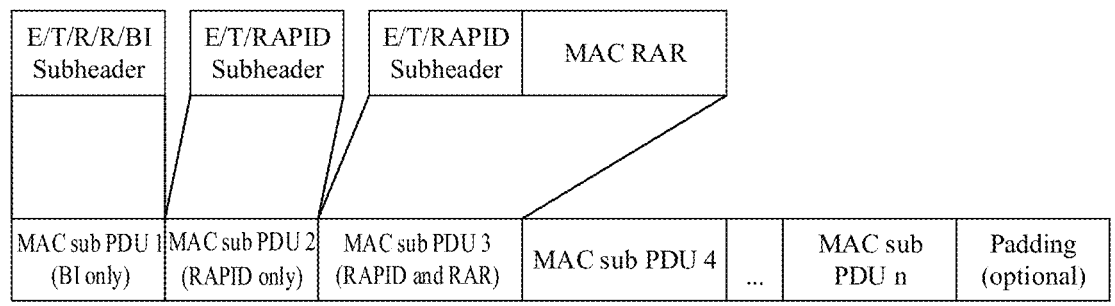
FIG. 5 is a structural schematic diagram of a Media Access Control (MAC) Protocol Data Unit (PDU) according to an embodiment of the disclosure.

FIG. 5 is a structural schematic diagram of a MAC PDU including a MAC RAR. As illustrated in FIG. 5, a MAC header includes multiple MAC subheaders. Of course, a MAC header may also include one MAC subheader.

If a certain RAR is of a RAPID type, a structure of the RAR may be as illustrated in FIG. 6. Field "R" is a reserved bit and is fixedly padded with 0. The RAR may include at least one of: a UL TA, UL grant information, or a temporary C-RNTI. The UL grant information is configured to indicate a UL resource available for the terminal device to send the MSG3. The UL TA is configured to regulate a UL time sequence for UL data sending of the terminal device. The temporary C-RNTI is configured to scramble a PDCCH in a Message 4 (MSG4).

In S230, the terminal device determines whether the MSG2 is an RAR message for itself after receiving the MSG2. The terminal device may send an MSG3 on an available UL resource indicated by the network device after determining that the MSG2 is an RAR message for itself. The MSG3 may be an RRC message.

The MSG3 may contain an RNTI dedicated to the terminal device.

The MSG3 is mainly used to notify the network device the event triggering the random access process. For example, the MSG3 may carry a terminal device identifier and an establishment event if the random access process is an initial random access process. The establishment event is, for example, an RRC connection request message. For another example, the MSG3 may carry a terminal device identifier in a connected state and a reestablishment event if the random access process is an RRC connection reestablishment process. For example, the reestablishment event is an RRC connection reestablishment process.

Furthermore, the terminal device identifier carried in the MSG3 may be used to determine whether contention succeeds in the MSG4 or not.

In S240, the terminal device receives the MSG4 sent by the network device. The MSG4 may also be referred to as a contention resolution message, and may be used to determine whether contention succeeds. The MSG4 may further include the UL resource allocated to the terminal device by the network device. When a terminal device identifier carried in the MSG4 is the same as that sent to the network device by the terminal device in the MSG3, it indicates that random access succeeds, and the terminal device may perform UL transmission on the UL resource indicated in the MSG4. When the terminal device identifier carried in the MSG4 is different from that sent to the network device by the terminal device in the MSG3, it indicates that the random access of the terminal device fails, and after the random access fails, the terminal device may re-execute steps S210 to S240 to re-initiate the random access.

The MSG4 has two functions: one is to indicate the terminal device whether the contention for random access succeeds, and another one is to transmit an RRC configuration message to the terminal device.

The terminal device may enable a receiving window after sending the MSG3 to the network device. For example, the terminal device may start a contention resolution timer and monitor the MSG4 sent by the network device before the timer expires.

Contention-free random access will now be described in combination with FIG. 7. The method illustrated in FIG. 7 may include steps S710 to S730.

In S710, a network device configures a contention-free random access preamble for a terminal device.

In S720, the terminal device sends a contention-free random access preamble to the network device.

In S730, the network device sends an RAR to the terminal device.

The terminal device, after sending the random access preamble to the network device, may enable an RAR window and monitor the RAR sent by the network device in the RAR window.

For contention-free random access, when the terminal device receives the RAR sent by the network device, it indicates that the terminal device succeeds in random access.

Referring to the above descriptions, a conventional four-step random access process requires four signaling interactions between the terminal device and the network device for successful access. The four-step random access process easily brings the problems of high signaling overhead and long access delay.

Therefore, a two-step random access process is proposed to reduce the signaling overhead and the access delay. Briefly, in the two-step random access process, it is equivalent to combine the first step and the third step of the four-step random access process into the first step of the two-step random access process and combine the second step and the fourth step of the four-step random access process into the second step of the two-step random access process.

The two-step random access process will now be described in combination with FIG. 8.

In S810, a terminal device sends a Message A (MSGA) to a network device. The MSGA includes a random access preamble, UL data, and a terminal device identifier.

The UL data may be born in a Physical Uplink Shared Channel (PUSCH). The PUSCH may carry an RNTI specific to the terminal device.

Optionally, the content of the UL data may change according to different random access cases. For example, the UL data may include an RRC connection request message for the case that a random access is initiated for initial access. For another example, the UL data may include an RRC connection reestablishment request message for the case that a random access is initiated for RRC connection reestablishment.

The UL data may also be UL information born in a PDCCH.

Optionally, the random access preamble may be a preamble randomly selected by the terminal device. For example, the preamble may be one of multiple preambles provided by the network device.

In S820, the network device sends a Message B (MSGB) to the terminal device.

The MSGB may include an RAR and a contention resolution message.

The terminal device may enable a receiving window after sending the MSGA to the network device. The terminal device may monitor the MSGB sent by the network device in the receiving window.

Figure 2:
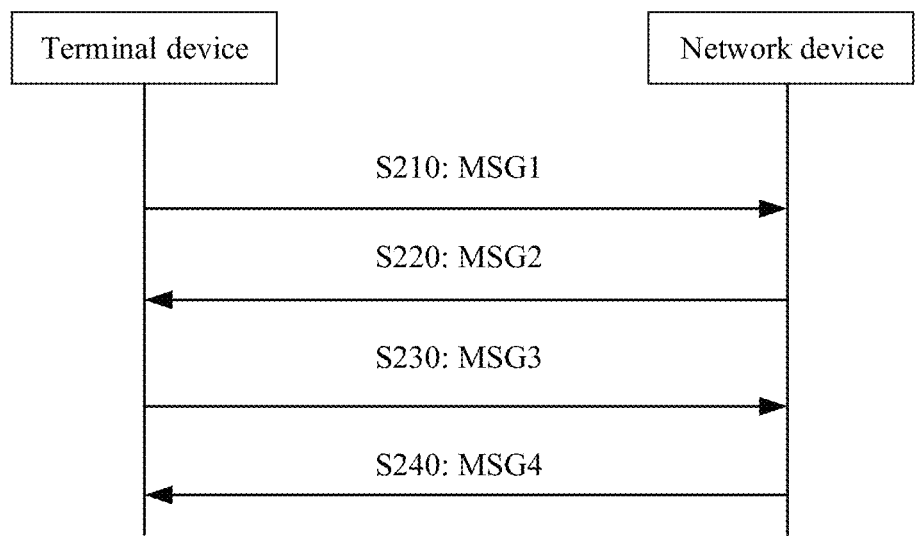
FIG. 2 is a schematic diagram of a four-step random access process according to an embodiment of the disclosure.
Figure 7:
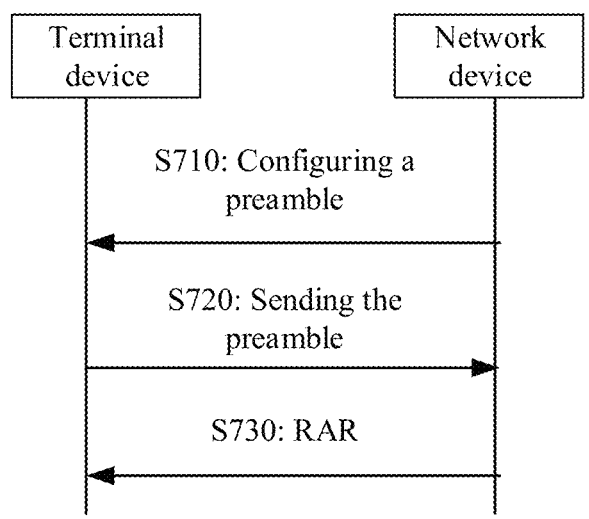
FIG. 7 is a schematic diagram of a contention-free random access process according to an embodiment of the disclosure.
Figure 8:
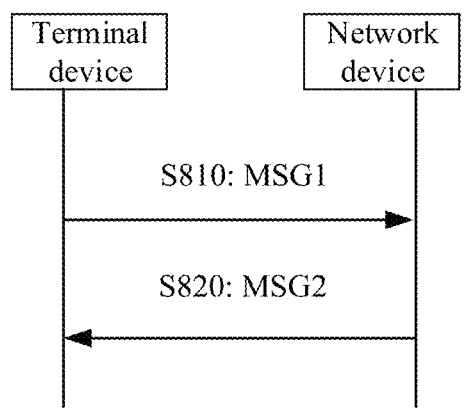
FIG. 8 is a schematic diagram of a two-step random access process according to an embodiment of the disclosure.

Referring to the above descriptions of FIG. 2, FIG. 7 and FIG. 8, the terminal device, after completing sending a first message in a random access process to the network device, immediately enables a receiving window and starts monitoring a second message sent by the network device. The first message may be any message sent to the network device by the terminal device in the random access process. For example, the first message may be the first message in the random access process, or may be the third message in the random access process. The second message may be a message returned to the terminal device by the network device based on the first message.

However, due to the existence of a propagation delay, the network device cannot receive the first message immediately when the terminal device completes sending the first message. Moreover, the network device needs time to process the first message. Therefore, if the terminal device starts monitoring the second message immediately after sending the first message, it will cause a waste of resources of the terminal device, and it is unfavorable for the power saving of the terminal device.

For example, the terminal device immediately enables the RAR window and starts monitoring the RAR after completing sending the MSG1 during the contention-based random access process. After receiving the RAR later and sending the MSG3 according to the UL grant resource indicated in the RAR, the terminal device immediately starts a contention resolution timer to start monitoring the MSG4. However, due to the existence of a round-trip propagation delay of signal propagation and the processing time of the network device, the terminal device cannot receive the MSG2 immediately after completing sending the MSG1 and cannot receive the MSG4 immediately after completing sending the MSG3. Therefore, it is not necessary to immediately monitor the PDCCH scheduling, which is unfavorable for the power saving of the terminal device.

Figure 9:
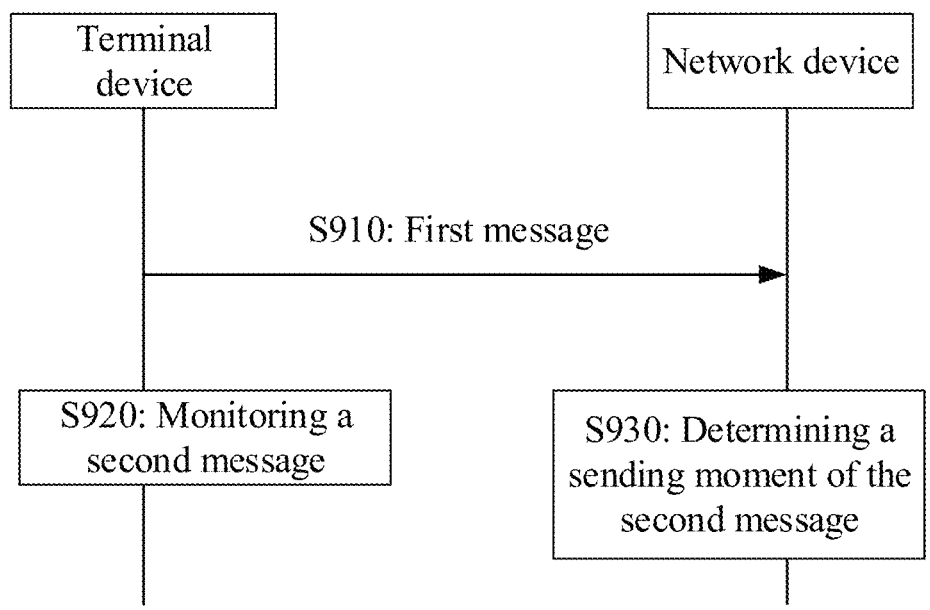
FIG. 9 is a schematic flowchart of a method for random access according to an embodiment of the disclosure.

Therefore, an embodiment of the disclosure provides a method for random access, which is favorable for saving the power of the terminal device to achieve a purpose of power saving. As illustrated in FIG. 9, the method includes steps S910 to S920.

A random access manner is not specifically limited in the embodiment of the disclosure, and may be contention-based random access, contention-free random access or two-step random access.

In S910, a terminal device sends a first message in a random access process to a network device.

The first message may be any message sent to the network device by the terminal device during the random access process. For example, for the contention-based random access, the message may be an MSG1 or MSG3. For contention-free random access, the first message may include a random access preamble configured for the terminal device by the network device. For two-step random access, the first message may be an MSGA.

In S920, the terminal device monitors a second message sent by the network device. The second message is a message sent by the network device based on the first message. The terminal device starts monitoring the second message at a moment later than the moment that the terminal device completes sending the first message.

The terminal device may determine the moment of starting monitoring the second message according to a certain rule after completing sending the first message. The moment of starting monitoring the second message is later than the moment of completing sending the first message.

In S930, the network device determines the moment of sending the second message. The moment of sending the second message is equal to or later than a moment that the network device generates the second message.

The operation that the network device determines the moment of sending the second message may include the following operations. The network device determines a moment of starting processing the first message. Alternatively, the network device determines a speed of processing the first message. Alternatively, the network device determines the moment of sending the second message after generating the second message.

The second message may also be understood as a message returned to the terminal device by the network device based on the first message. The second message is a response of the network device to the first message sent by the terminal device.

The first message may be any message sent to the network device by the terminal device during the random access process. The second message may be any message sent to the terminal device by the network device during the random access process.

The second message may be an MSG2 if the first message is an MSG1. The second message may be an MSG4 if the first message is an MSG3. The second message may be an MSGB if the first message is an MSGA.

In the embodiment of the disclosure, since the terminal device may not receive the second message sent by the network device immediately after completing sending the first message, after completing sending the first message, the terminal device does not immediately start monitoring the second message, but starts monitoring the second message at a moment later than the moment that completing sending the first message, which is favorable for saving the power of the terminal device to achieve a purpose of power saving.

A time interval between the moment of completing sending the first message and the moment of starting monitoring the second message is not specifically limited in the embodiment of the disclosure. The time interval may be any time interval greater than 0. The terminal device may start monitoring the second message after the time interval.

The time interval may be implemented by a timer. For example, the operation that the terminal device monitors a second message sent by the network device may include the following operations. The terminal device starts a target timer responsive to that sending the first message is completed. The terminal device starts monitoring the second message sent by the network device after the target timer expires.

For example, the terminal device starts the target timer after completing sending an MSG1 to the network device. The terminal device does not monitor PDCCH scheduling of the network device for receiving an RAR within the running period of the target timer. The terminal device starts monitoring the RAR after the target timer expires.

For another example, the terminal device receives an RAR sent by the network device after completing sending the MSG1 to the network device. The RAR indicates a UL grant resource available for the terminal device to send an MSG3. The terminal device may send the MSG3 to the network device on the UL grant resource. The terminal device may start the target timer after completing sending the MSG3 to the network device. The terminal device does not monitor the PDCCH scheduling of the network device for receiving a contention resolution message within the running period of the target timer. The terminal device starts monitoring the contention resolution message after the target timer expires.

For another example, the terminal device starts the target timer after completing sending an MSGA to the network device. The terminal device does not monitor the PDCCH scheduling of the network device for receiving an MSGB during the period that the target timer runs. The terminal device starts monitoring the MSGB after the target timer expires.

The network device generates a corresponding RAR based on the first message after receiving the first message sent by the terminal device. The network device, before sending the RAR to the terminal device, may consider the duration of the target timer to ensure that the terminal device will not schedule the RAR within the running period of the target timer, thereby avoiding the terminal device missing the reception of the RAR.

The network device, when sending the RAR, may determine a sending moment of the RAR based on the duration of the target timer to ensure that the moment the RAR arriving at the terminal device is not within the running period of the target timer, which can prevent the terminal device from missing the RAR.

The target timers used in different processes may be same or different. No specific limits are made thereto in the embodiment of the disclosure. For example, the target timer started after the terminal device completes sending the MSG1 may be the same as or different than the target timer started after the terminal device completes sending the MSG3.

The target timer may be referred to as an energy-saving timer or a Round Trip Time (RTT) timer.

The target timer is determined in many manners. No specific limits are made thereto in the embodiment of the disclosure. The target timer may be determined according to a first parameter. The first parameter includes at least one of: a first time configured by the network device, a Discontinuous Reception (DRX) parameter, a UL TA, the processing duration of the network device, or the preset first duration for a round-trip transmission of messages between the terminal device and the network device.

For example, the duration of the target timer may be determined according to the duration of the first time configured for the terminal device by the network device. For another example, the duration of the target timer may be determined according to the UL TA. Detailed descriptions will be made below in combination with specific cases.

As an example, the duration of the target timer may be determined according to the duration of the first time configured for the terminal device by the network device.

When configuring the first time, the network device mainly considers the processing duration of the network device and an average round-trip transmission delay of a signal. That is, the duration of the first time may be determined according to the processing duration of the network device and the first duration for the round-trip transmission of messages between the terminal device and the network device. For example, the first duration may represent a sum of the duration required from sending a message by the terminal device to receiving the message by the network device and the duration required from sending a message by the network device to receiving the message by the terminal device.

For example, the duration of the first time may be equal to a sum of the processing duration of the network device and the first duration. For another example, the duration of the first time may also be equal to the processing duration of the network device.

The first duration may be pre-configured by the network device. The network device may pre-configure first duration without knowing the UL TA of the terminal device. The first duration may be equal to twice the UL TA of the terminal device, or may be greater or equal to twice the UL TA of the terminal device.

The network device may configure the first time for the terminal device through SI. In such case, the terminal device in either an idle state or a connected state may determine the target timer according to the first time. Furthermore, the terminal device may start monitoring the second message after the target timer expires.

When the network device configures the first time through the SI, all terminal devices may use the first time with same duration.

The network device may also configure the first time for the terminal device through RRC dedicated signaling. This manner is applicable to a terminal device in an RRC connected state. For example, the network device may configure the first time for the terminal device through at least one of: a message during an RRC connection establishment process, a message during an RRC connection resume process, a message during an RRC reestablishment process, or a message during an RRC reconfiguration process.

For example, the network device may configure the first time for the terminal device through an RRC setup (RRC Setup) message. Alternatively, the network device may configure the first time for the terminal device through an RRC resume (RRCResume) message. Alternatively, the network device may configure the first time for the terminal device through an RRC reestablishment (RRCReestablishment) message. Alternatively, the network device may configure the first time for the terminal device through an RRC reconfiguration (RRCReconfiguration) message.

When configuring the first time through RRC dedicated signaling, the network device may configure the first times with different duration for different terminal devices.

The first time may also reuse the DRX parameter in the RRC signaling. The terminal device may determine the duration of the first time according to the DRX parameter configured by the network device.

For example, the terminal device may determine a DRX period as the duration of the first time. Alternatively, the terminal device may determine a dormancy period in a DRX period as the duration of the first time. Alternatively, the terminal device may perform a series of processes on a DRX period to obtain the duration of the first time.

For example, the duration of the first time may be a UL Hybrid Automatic Repeat reQuest (HARD) RTT timer of the DRX.

Optionally, the duration of the target timer may be equal to that of the first time. The terminal device, after receiving the first time configured by the network device, may determine the duration of the first time as the duration of the target timer and perform random access according to the target timer.

As another example, the duration of the target timer may be determined according to the UL TA. The UL TA may be obtained by the terminal device from an RAR message. Alternatively, the UL TA may be broadcast to the terminal device by the network device through SI.

The duration of the target timer may be equal to twice a value of the TA. In the embodiment of the disclosure, twice the value of the TA is determined as the duration of the target timer without adding the processing duration of the network device. Therefore, the terminal device will not miss the reception of the second message regardless of the duration of processing the first message by the network device.

The duration of the target timer may also be set to a sum of twice the TA and the second duration. The second duration is preset processing duration of the network device.

The second duration may be any duration longer than 0. Alternatively, the second duration may be determined according to the processing duration of the network device.

The second duration may be configured for the terminal device by the network device. A configuration manner for the second duration is similar to that for the first time. For example, the network device may configure the second duration for the terminal device through SI and/or RRC dedicated signaling.

The network device may configure the second duration for the terminal device through an RRC setup (RRCSetup) message. Alternatively, the network device may configure the second duration for the terminal device through an RRC resume (RRCResume) message. Alternatively, the network device may configure the second duration for the terminal device through an RRC reestablishment (RRCReestablishment) message. Alternatively, the network device may configure the second duration for the terminal device through an RRC reconfiguration (RRCReconfiguration) message.

The second duration may also reuse the DRX parameter in the RRC signaling. The terminal device may determine the second duration according to the DRX parameter configured by the network device.

For example, the terminal device may determine a DRX period as the second duration. Alternatively, the terminal device may determine a dormancy period in a DRX period as the second duration. Alternatively, the terminal device may perform a series of processes on a DRX period to obtain the second duration.

For example, the second duration may be the duration of a UL HARQ RTT timer of DRX.

The above describes multiple manners for determining the target timer. However, the embodiment of the disclosure is not limited thereto. The duration of the target timer may be the duration of the parameter with a maximum duration in the first parameter.

As an example, the duration of the target timer may be determined according to the duration of the first time and twice a value of the TA. The terminal device may determine the greater value of: the duration of the first time, and twice the value of the TA, as the duration of the target timer.

Since the terminal device may not receive the second message within the duration of the first time and the duration of twice the value of the TA, determining the greater value of the two duration values as the duration of the target timer may ensure the power saving of the terminal device maximally.

As another example, the duration of the target timer may be determined according to the duration of the first time and a sum of twice a value of the TA and the second duration. The terminal device may determine the greater value of: the duration of the first time, and the sum of twice the value of the TA and the second duration, as the duration of the target timer.

Since the terminal device may not receive the second message sent by the network device within the duration of the first time and total duration of twice the value of the TA and the second duration, determining the greater value of the two duration values as the duration of the target timer may ensure the power saving of the terminal device maximally.

As another example, the duration of the target timer may be determined according to the duration of the first time and the DRX parameter. The terminal device may determine the greater value of: the duration of the first time, and the duration determined according to the DRX parameter, as the duration of the target timer.

A starting moment of a second timer is not specifically limited in the embodiment of the disclosure. The second timer may be started after the target timer expires. Alternatively, the second timer may be started simultaneously with the target timer. The duration of the second timer is the duration of monitoring the second message.

As an example, the second timer is started after the target timer expires. The operation that the terminal device starts monitoring the second message after the target timer expires may include the following operation. After the target timer expires, the terminal device starts the second timer responsive to the expiration of the target timer. The duration of the second timer is the duration for which the terminal device monitors the second message.

The duration of the second timer is equal to a length of an RAR window if the first message is an MSG1. The terminal device starts the target timer after completing sending the MSG1. The terminal device does not monitor an RAR within the running period of the target timer. After the target timer expires, the terminal device starts the RAR window and monitors the RAR in the RAR window.

The duration of the second timer is equal to that of a contention resolution timer if the first message is an MSG3. The terminal device starts the target timer after completing sending the MSG3. The terminal device does not monitor a contention resolution message within the running period of the target timer. After the target timer expires, the terminal device starts the contention resolution timer and monitors the contention resolution timer during the running period of the contention resolution timer.

Figure 10:
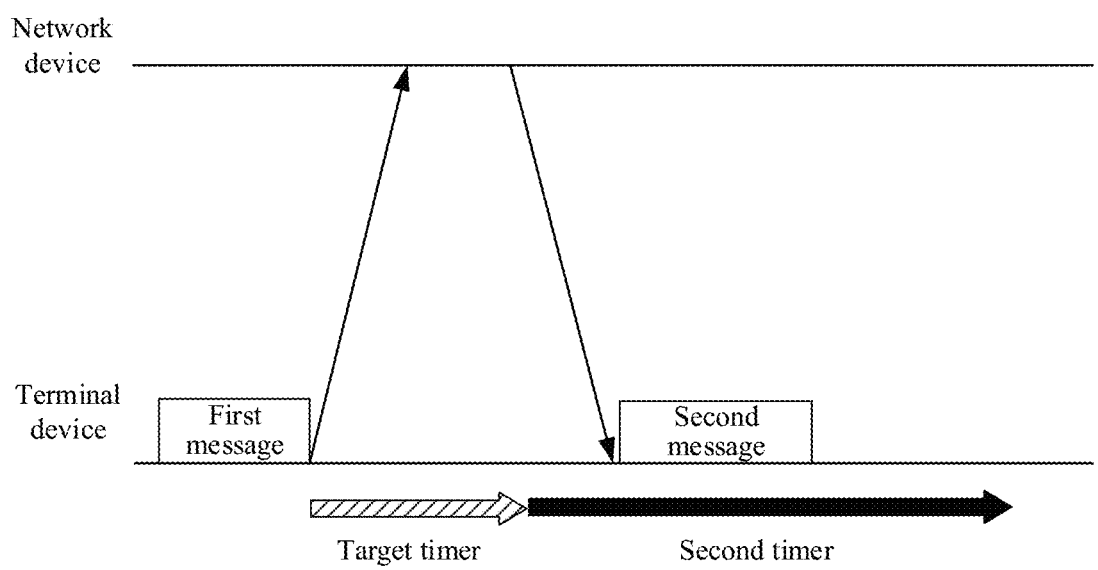
FIG. 10 is a schematic diagram of another method for random access according to an embodiment of the disclosure.

As illustrated in FIG. 10, the terminal device starts the target timer after completing sending the first message to the network device. After the target timer expires, the terminal device starts the second timer and starts monitoring the second message sent by the network device.

As another example, the second timer is started simultaneously with the target timer. The operation that the terminal device starts monitoring the second message after the target timer expires may include the following operation. The terminal device simultaneously starts the target timer and the second timer after completing sending the first message. The duration of the second timer is the duration for which the terminal device monitors the second message.

The duration of the second timer may be equal to a length of an RAR window if the first message is an MSG1. The terminal device simultaneously starts the target timer and the first time after completing sending the MSG1. The terminal device does not monitor an RAR during the period that the target timer and the second timer simultaneously run. When the target timer expires, the terminal device monitors the RAR during the period that the second timer runs.

The duration of the second timer is equal to that of a contention resolution timer if the first message is an MSG3. The terminal device simultaneously starts the target timer and the second timer after completing sending the MSG3.

The terminal device does not monitor a contention resolution message during the period that the target timer and the second timer simultaneously run. When the target timer expires, the terminal device monitors the contention resolution message during the period that the second timer runs.

Figure 11:
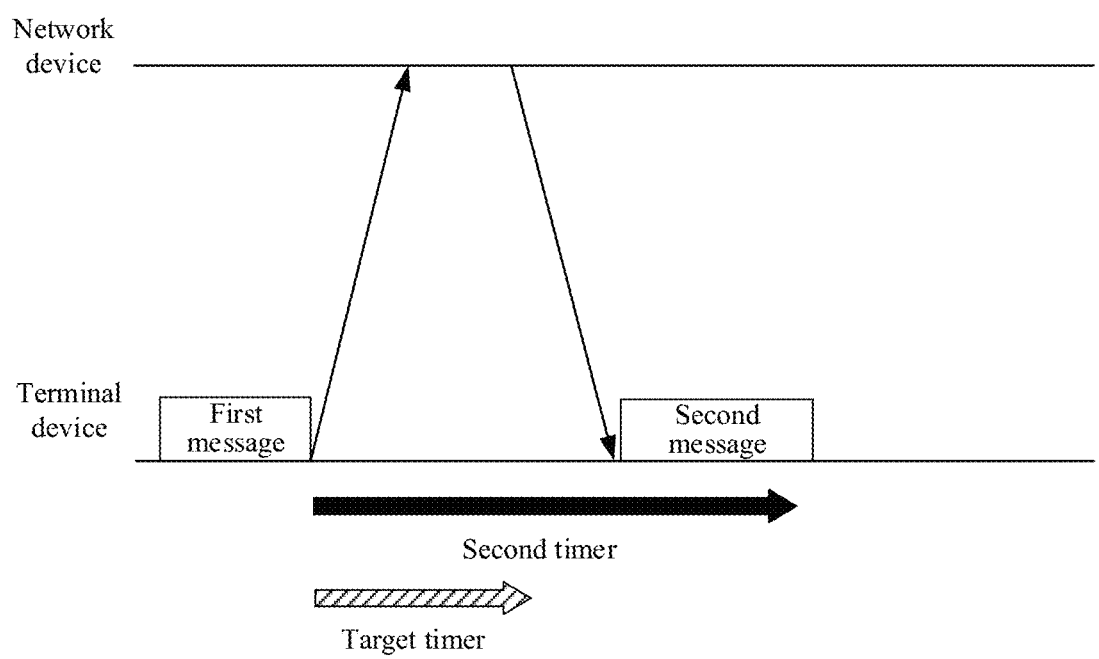
FIG. 11 is a schematic diagram of another method for random access according to an embodiment of the disclosure.

As illustrated in FIG. 11, the terminal device simultaneously starts the target timer and the second timer after completing sending the first message to the network device. The terminal device does not monitor the second message during the period that the second timer and the target timer simultaneously run. When the target timer expires, the terminal device starts monitoring the second message during the period that the second timer runs.

Referring to FIG. 10 and FIG. 11, the network device may consider the duration of the target timer when sending the second message to the terminal device. The network device may determine the duration between a sending moment of the second message and a receiving moment of the first message according to a difference between the duration of the target timer and twice the value of the UL TA.

When the network device pre-configures the target timer through SI, the duration of the configured target timer is the same for all terminal devices. However, the UL TA for terminal devices at different positions is different in fact. Therefore, when communicating with different terminal devices, the network device may regulate the sending moment of the second message according to the different terminal devices, to ensure that the terminal devices will not miss the reception of the second message.

The network device may send the second message immediately after generating the second message if the duration of the target timer is exactly equal to a sum of the processing duration of the network device and twice the value of the UL TA. This is because in that case, a moment that the second message arrives at the terminal device is exactly a moment that the target timer expires.

The network device may also send the second message immediately after generating the second message if the duration of the target timer is less than the sum of the processing duration of the network device and twice the value of the UL TA. This is because in that case, although the second message has yet not arrived at the terminal device after the target timer expires, the reception of the second message by the terminal device may not be affected and the terminal device may not miss the second message.

If the duration of the target timer is greater than the sum of the processing duration of the network device and twice the UL TA, the network device needs to take a time interval after generating the second message before sending the second message to the terminal device. Alternatively, the network device may take a time interval after receiving the first message before starting processing to generate the second message. This is due to the long duration of the target timer, and if the network device sends the message immediately after generating the second message, the second message may arrive at the terminal device within the running period of the target timer, which will lead to the terminal device may not receive the second message. In such case, if the network device currently has a lot of data to process, the network device may prioritize the other data and then process the first message.

The solution of the embodiment of the disclosure will be described below with a four-step random access process as an example. Features not described below may refer to the above descriptions, and will not be elaborated herein for brevity.

The network device may configure a first time for the terminal device through SI. The terminal device may acquire the first time from the SI. The terminal device may determine a target timer 1 according to the duration of the first time. For example, the terminal device may determine the duration of the first time as that of the target timer 1.

The terminal device starts the target timer 1 after completing sending an MSG1 to the network device. The terminal device does not monitor an MSG2 during the running period of the target timer 1. The terminal device starts monitoring the MSG2 after the timer expires.

The terminal device may enable an RAR window while starting the target timer 1. The terminal device does not monitor an RAR during the period that the target timer 1 and the RAR window simultaneously run. When the target timer 1 expires and the RAR window runs, the terminal device monitors the RAR during the running period of the RAR window. Alternatively, the terminal device may enable the RAR window after the target timer 1 expires and monitor the RAR in the RAR window.

The network device generates the corresponding RAR after receiving the MSG1 sent by the terminal device. The network device may consider the duration of the target timer 1 after sending the RAR.

The terminal device may send an MSG3 on a UL resource indicated in the RAR after receiving the RAR sent by the network device. Furthermore, the terminal device may also acquire a UL TA from the RAR.

The terminal device may start a target timer 2 after completing sending the MSG3. The terminal device may not monitor an MSG4 during the running period of the target timer. The terminal device starts monitoring the MSG4 after the target timer 2 expires.

The duration of the target timer 2 may be the same as or different than the duration of the target timer 1. Determination manner for the target timer 2 may be the same as or different from that for the target timer 1.

The terminal device determines the target timer 2 in many manners. No specific limits are made thereto in the embodiment of the disclosure.

The terminal device may determine the target timer 1 as the target timer 2. That is, the target timer 2 is determined according to the duration of the first time.

The terminal device may also determine the target timer 2 according to a TA. For example, the duration of the target timer 2 may be twice a value of the TA. The terminal device may also determine a sum of twice a value of the TA and the second duration as the duration of the target timer 2 if the network device broadcasts the second duration in the SI or the network device broadcasts the second duration in RRC signaling.

The second duration may be determined according to processing duration of the network device. For example, the second duration may be equal to the processing duration of the network device.

The terminal device may also compare the first time and the value of the TA to determine the target timer 2.

For example, the terminal device may determine the duration of the first time as that of the target timer 2 if the duration of the first time is greater than the twice the value of the TA. The terminal device may determine the twice the value of the TA as the duration of the target timer 2 if the duration of the first time is less than twice the value of the TA.

For another example, the terminal device may determine the duration of the first time as that of the target timer 2 if the duration of the first time is greater than the sum of twice the value of the TA and the second duration. The terminal device may determine the sum of twice the value of the TA and the second duration as the duration of the target timer 2 if the duration of the first time is less than the sum of twice the value of the TA and the second duration.

The terminal device may start a contention resolution timer while starting the target timer 2. The terminal device may not monitor the MSG4 during the period that the target timer 2 and the contention resolution timer simultaneously run, and may monitor the MSG4 within the running period of the contention resolution timer after the target timer 2 expires. Alternatively, the terminal device may start the contention resolution timer after the target timer expires and monitor the MSG4 within the running period of the contention resolution timer.

The embodiment of the disclosure is described with the random access process as an example. However, the disclosure is not limited thereto. The method of the embodiment of the disclosure may be used to save the power of the terminal device in other cases as long as the terminal device cannot immediately receive a message returned by the network device.

The terminal device in the embodiment of the disclosure may be a terminal device in an IoT. In the IoT, data transmission between terminal devices is basically occurs in a random access process. In practice, the power saving of the terminal device in the IoT is power saving in the random access process. Therefore, the method for random access in the embodiment of the disclosure is particularly suitable for a terminal device in the IoT, and the energy saving for the terminal device in the IoT is more significantly.

The method for random access according to the embodiments of the disclosure is described above in detail. An apparatus according to the embodiments of the disclosure will be described below in combination with FIG. 12 to FIG. 16. The technical features described in the method embodiments are suitable for the following apparatus embodiments.

Figure 12:
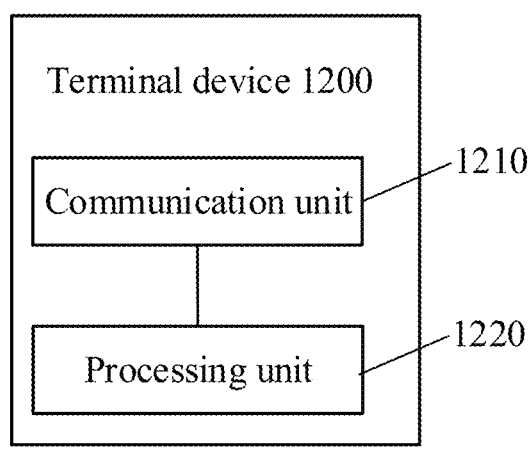
FIG. 12 is a schematic block diagram of a terminal device according to an embodiment of the disclosure.

FIG. 12 is a schematic block diagram of a terminal device according to an embodiment of the disclosure. The terminal device may be any above-described terminal device. The terminal device 1200 in FIG. 12 includes a communication unit 1210 and a processing unit 1220.

The communication unit 1210 is configured to send a first message in a random access process to a network device.

The processing unit 1220 is configured to monitor a second message sent by the network device. The second message is a message sent by the network device based on the first message. The terminal device starts monitoring the second message at a moment later than a moment that the terminal device completes sending the first message.

Optionally, the processing unit 1220 is configured to start a target timer responsive to that sending the first message is completed, and start monitoring the second message after the target timer expires.

Optionally, the duration of the target timer is determined according to a first parameter. The first parameter includes at least one of: a first time configured by the network device, a DRX parameter, a UL TA, processing duration of the network device, or the first duration preset for a round-trip transmission of messages between the terminal device and the network device.

Optionally, the first parameter is sent to the terminal device by the network device through SI and/or RRC signaling.

Optionally, the RRC signaling includes at least one of: an RRC setup message, an RRC resume message, an RRC reestablishment message, or an RRC reconfiguration message.

Optionally, the first time is determined according to the processing duration of the network device and the first duration.

Optionally, the UL TA is obtained by the terminal device from an RAR message.

Optionally, the duration of the target timer is equal to the duration of the first time.

Optionally, the DRX parameter includes a duration configuration of a UL HARQ RTT timer. The duration of the target timer is the duration of the UL HARQ RTT timer.

Optionally, the duration of the target timer is equal to twice a value of the UL TA.

Optionally, the duration of the target timer is equal to a sum of twice a value of the UL TA and the processing duration of the network device.

Optionally, the duration of the target timer is the greater value of: the duration of the first time, and twice a value of the UL TA.

Optionally, the time of the target timer is the greater value of: the duration of the first time, and a sum of twice a value of the UL TA and the processing duration of the network device.

Optionally, the processing unit 1220 is configured to start a second timer responsive to that the target timer expires, the duration of the second timer is the preset duration for which the terminal device monitors the second message, and monitor the second message for the duration of the second timer.

Optionally, the processing unit 1220 is configured to start a second timer responsive to that sending the first message is completed, the duration of the second timer is the preset duration for which the terminal device monitors the second message and the duration of the second timer is longer than that of the first time, and monitor the second message after the first time expires and before the second timer expires.

Optionally, the first message includes a random access preamble. The second message is the RAR message.

Optionally, random access initiated to the network device by the terminal device is a two-step random access. The first message is an MSGA. The second message is an MSGB.

Optionally, the first message is the third message in the random access process. The second message is the contention resolution message.

Optionally, the terminal device is a terminal device in an IoT.

Figure 13:
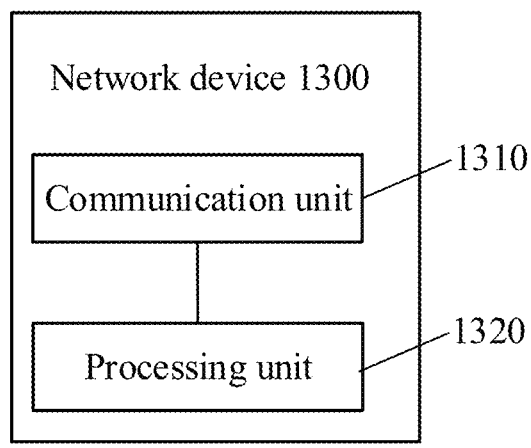
FIG. 13 is a schematic block diagram of a network device according to an embodiment of the disclosure.

FIG. 13 is a schematic block diagram of a network device according to an embodiment of the disclosure. The network device may be any above-described network device. The network device 1300 in FIG. 13 includes a communication unit 1310 and a processing unit 1320.

The communication unit 1310 is configured to receive a first message sent by a terminal device in a random access process.

The processing unit 1320 is configured to determine a sending moment of a second message according to a target timer. The second message is a message sent by the network device in response to the first message. The duration of the target timer is equal to the duration from the moment of completing sending the first message by the terminal device to the moment of starting monitoring the second message by the terminal device.

Optionally, the duration of the target timer is determined according to a first parameter. The first parameter includes at least one of: a first time configured by the network device, a DRX parameter, a UL TA, the processing duration of the network device, or the first duration preset for a round-trip transmission of messages between the terminal device and the network device.

Optionally, the communication unit 1310 is configured to send the first parameter to the terminal device through SI and/or RRC signaling.

Optionally, the RRC signaling includes at least one of: an RRC setup message, an RRC resume message, an RRC reestablishment message, or an RRC reconfiguration message.

Optionally, the first time is determined according to the processing duration of the network device and the first time.

Optionally, the communication unit 1310 is configured to send the UL TA to the terminal device through an RAR message.

Optionally, the duration of the target timer is equal to the duration of the first time.

Optionally, the DRX parameter includes a duration configuration of a UL HARQ RTT timer. The duration of the target timer is the duration of the UL HARQ RTT timer.

Optionally, the duration of the target timer is equal to twice a value of the UL TA.

Optionally, the duration of the target timer is equal to a sum of twice a value of the UL TA and the processing duration of the network device.

Optionally, the duration of the target timer is the greater value of: the duration of the first time, and twice a value of the UL TA.

Optionally, the duration of the target timer is the greater value of: the duration of the first time, and a sum of twice a value of the UL TA and the processing duration of the network device.

Optionally, the first message includes a random access preamble. The second message is the RAR message.

Optionally, random access initiated to the network device by the terminal device is two-step random access. The first message is an MSGA. The second message is an MSGB.

Optionally, the first message is third message in the random access process. The second message is contention resolution message.

Optionally, the terminal device is a terminal device in an IoT.

Figure 14:
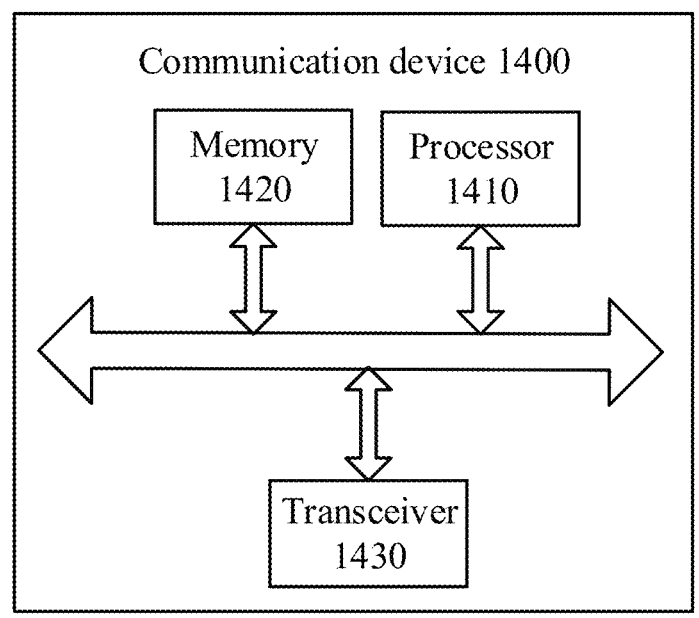
FIG. 14 is a schematic structure diagram of a communication device according to an embodiment of the disclosure.

FIG. 14 is a schematic structure diagram of a communication device 1400 according to an embodiment of the disclosure. The communication device 1400 illustrated in FIG. 14 includes a processor 1410. The processor 1410 may call and run a computer program in a memory to implement the method in the embodiments of the disclosure.

Optionally, as illustrated in FIG. 14, the communication device 1400 may further include the memory 1420. The processor 1410 may call and run the computer program in the memory 1420 to implement the method in the embodiments of the disclosure.

The memory 1420 may be an independent device independent of the processor 1410, or may be integrated into the processor 1410.

Optionally, as illustrated in FIG. 14, the communication device 1400 may further include a transceiver 1430. The processor 1410 may control the transceiver 1430 to communicate with another device, specifically sending information or data to the other device or receiving information or data sent by the other device.

The transceiver 1430 may include a transmitter and a receiver. The transceiver 1430 may further include antennas. The number of the antennas may be one or more.

Optionally, the communication device 1400 may specifically be the network device of the embodiments of the disclosure. The communication device 1400 may implement corresponding processes implemented by the network device in each method of the embodiments of the disclosure, which will not be elaborated herein for brevity.

Optionally, the communication device 1400 may specifically be the mobile terminal/terminal device of the embodiments of the disclosure. The communication device 1400 may implement the corresponding processes implemented by the mobile terminal/terminal device in each method of the embodiments of the disclosure. Specifically, the communication device 1400 may implement the corresponding flows implemented by the first terminal device and/or the second terminal device in each method of the embodiments of the disclosure, which will not be elaborated herein for brevity.

Figure 15:
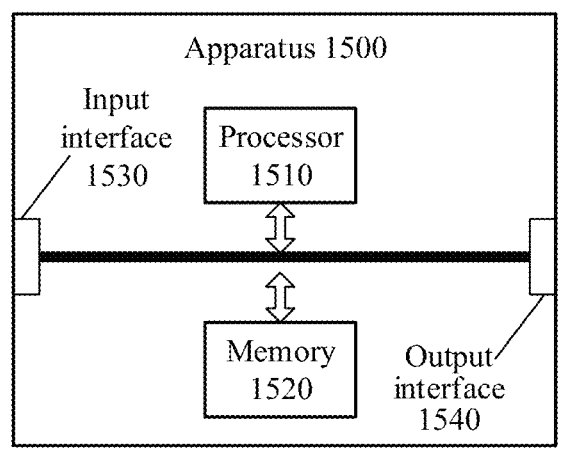
FIG. 15 is a schematic structure diagram of an apparatus according to an embodiment of the disclosure.

FIG. 15 is a schematic structure diagram of an apparatus according to another embodiment of the disclosure. The apparatus 1500 illustrated in FIG. 15 includes a processor 1510. The processor 1510 may call and run a computer program in a memory to implement the method in the embodiments of the disclosure.

Optionally, as illustrated in FIG. 15, the apparatus 1500 may further include the memory 1520. The processor 1510 may call and run the computer program in the memory 1520 to implement the method in the embodiments of the disclosure.

The memory 1520 may be an independent device independent of the processor 1515, or may be integrated into the processor 1510.

Optionally, the apparatus 1500 may further include an input interface 1530. The processor 1510 may control the input interface 1530 to communicate with another device or apparatus, specifically acquiring information or data sent by the other device or apparatus.

Optionally, the apparatus 1500 may further include an output interface 1540. The processor 1510 may control the output interface 1540 to communicate with the other device or apparatus, specifically outputting information or data sent by the other device or apparatus.

Optionally, the apparatus may be applied to the network device of the embodiments of the disclosure. The apparatus may implement corresponding processes implemented by the network device in each method of the embodiments of the disclosure, which will not be elaborated herein for brevity.

Optionally, the apparatus may be applied to the mobile terminal/terminal device of the embodiment of the disclosure. The apparatus may implement corresponding processes implemented by the mobile terminal/terminal device in each method of the embodiment of the disclosure, which will not be elaborated herein for brevity.

It is to be understood that the apparatus mentioned in the embodiment of the disclosure may be a chip and the chip may also be referred to as a system-level chip, a system chip, a chip system or a system on chip, etc.

Figure 16:
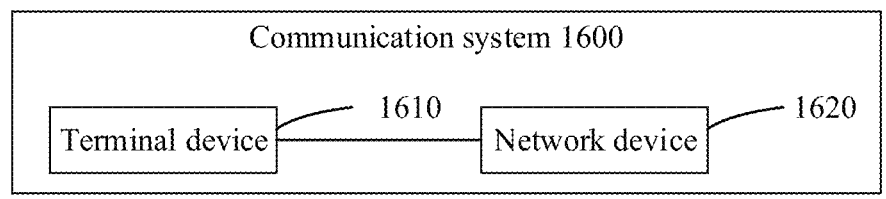
FIG. 16 is a schematic block diagram of a communication system according to an embodiment of the disclosure.

FIG. 16 is a second block diagram of a communication system 1600 according to an embodiment of the disclosure. As illustrated in FIG. 16, the communication system 1600 includes a terminal device 1610 and a network device 1620.

The terminal device 1610 may be configured to implement corresponding functions implemented by the terminal device in the above method. The network device 1620 may be configured to implement corresponding functions implemented by the network device in the above method. For brevity, it will not be elaborated herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a general-purpose processor, a Digital Signal Processor (DSP), an Application Specific Integrated Circuit (ASIC), a Field Programmable Gate Array (FPGA) or another programmable logic device, a discrete gate or transistor logic device, and a discrete hardware component. The method, step and logical block diagram disclosed in the embodiments of the disclosure may be implemented or executed. The general-purpose processor may be a microprocessor. Alternatively, the processor may be any conventional processor, etc. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory. The processor reads information in the memory and completes the steps of the method in combination with hardware.

It is to be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be understood that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

An embodiment of the disclosure also provides a computer-readable storage medium, which is configured to store a computer program.

Optionally, the computer-readable storage medium may be applied to a network device in the embodiments of the disclosure. The computer program enables a computer to execute corresponding processes implemented by the network device in each method of the embodiments of the disclosure. For brevity, elaborations are omitted herein.

Optionally, the computer-readable storage medium may be applied to a mobile terminal/terminal device in the embodiments of the disclosure. The computer program enables a computer to execute corresponding processes implemented by the mobile terminal/terminal device in each method of the embodiments of the disclosure. For brevity, elaborations are omitted herein.

An embodiment of the disclosure also provides a computer program product, which includes a computer program instruction.

Optionally, the computer program product may be applied to a network device in the embodiments of the disclosure. The computer program instruction enables a computer to execute corresponding processes implemented by the network device in each method of the embodiments of the disclosure. For brevity, elaborations are omitted herein.

Optionally, the computer program product may be applied to a mobile terminal/terminal device in the embodiments of the disclosure. The computer program instruction enables the computer to execute corresponding processes implemented by the mobile terminal/terminal device in each method of the embodiments of the disclosure. For brevity, elaborations are omitted herein.

An embodiment of the disclosure also provides a computer program.

Optionally, the computer program may be applied to a network device in the embodiments of the disclosure. The computer program runs in a computer to enable the computer to execute corresponding processes implemented by the network device in each method of the embodiments of the disclosure. For brevity, elaborations are omitted herein.

Optionally, the computer program may be applied to a mobile terminal/terminal device in the embodiments of the disclosure. The computer program runs in the computer to enable the computer to execute corresponding processes implemented by the mobile terminal/terminal device in each method of the embodiments of the disclosure. For brevity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may refer to the corresponding processes in the method embodiment and will not be elaborated herein for the ease and brevity of description.

In some embodiments provided in the disclosure, it is to be understood that the disclosed system, apparatus and method may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated. Parts displayed as units may or may not be physical units, namely they may be located in the same place, or may be distributed to multiple network units.

Part or all of the units may be selected to achieve the purposes of the solutions of the embodiments according to a practical requirement.

In addition, each function unit in each embodiment of the disclosure may be integrated into a processing unit. Alternatively, each unit may physically exist independently. Alternatively, two or more than two units may be integrated into a unit.

The function may also be stored in a computer-readable storage medium when realized in form of a software function unit and sold or used as an independent product. For such an understanding, the technical solutions of the disclosure substantially or parts making contributions to the conventional art or part of the technical solutions may be embodied in form of a software product. The computer software product is stored in a storage medium, including a plurality of instructions configured to enable a computer device (which may be a personal computer, a server, a network device, or the like) to execute all or part of the steps of the method in each embodiment of the disclosure. The above-mentioned storage medium includes: various media capable of storing program codes such as a U disk, a mobile hard disk, a ROM, a RAM, a magnetic disk, or an optical disk.

The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for random access, comprising:
sending, by a terminal device, a first message in a random access process to a network device; and
monitoring, by the terminal device, a second message sent by the network device, the second message being a message sent by the network device based on the first message, wherein the terminal device starts monitoring the second message at a moment later than a moment that the terminal device completes sending the first message; wherein the method further comprises:
responsive to that sending the first message is completed, starting, by the terminal device, a target timer and a second timer, a duration of the second timer being a preset duration for which the terminal device monitors the second message and the duration of the second timer being longer than a duration of the target timer,
wherein monitoring, by the terminal device, the second message sent by the network device comprises:
starting, by the terminal device, the monitoring of the second message after the target timer expires and before the second timer expires;
wherein the random access process initiated to the network device by the terminal device is a two-step random access process, the first message is a Message A (MSGA), and the second message is a Message B (MSGB).

2. The method of claim 1, wherein a duration of the target timer is determined according to a first parameter; and the first parameter comprises at least one of: a first timer configured by the network device, a Discontinuous Reception (DRX) parameter, an Uplink (UL) Timing Advance (TA), a processing duration of the network device, or a first duration preset for a round-trip transmission of messages between the terminal device and the network device.

3. The method of claim 2, wherein the first parameter is sent to the terminal device by the network device through at least one of: System Information (SI) or a Radio Resource Control (RRC) signaling.

4. The method of claim 2, wherein the first timer is determined according to the processing duration of the network device and the first duration.

5. The method of claim 2, wherein the DRX parameter comprises a duration configuration of a UL Hybrid Automatic Repeat reQuest (HARQ) Round Trip Time (RTT) timer, and the duration of the target timer is a duration of the UL HARQ RTT timer.

6. The method of claim 1, wherein the terminal device is a terminal device in an Internet of Things (IoT).

7. A terminal device, comprising:
a memory configured to store a computer program; and
a processor;
wherein the processor is configured to execute the computer program to:
send a first message in a random access process to a network device; and
monitor a second message sent by the network device, the second message being a message sent by the network device based on the first message, wherein the terminal device starts monitoring the second message at a moment later than a moment that the terminal device completes sending the first message;
wherein the processor is further configured to execute the computer program to:
start a target timer and a second timer responsive to that sending the first message is completed;
wherein a duration of the second timer being preset duration for which the terminal device monitors the second message and the duration of the second timer being longer than a duration of the target timer; and
start monitoring the second message after the target timer expires and before the second timer expires;
wherein the random access process initiated to the network device by the terminal device is a two-step random access process, the first message is a Message A (MSGA), and the second message is a Message B (MSGB).

8. The terminal device of claim 7, wherein a duration of the target timer is determined according to a first parameter; and the first parameter comprises at least one of: a first timer configured by the network device, a Discontinuous Reception (DRX) parameter, an Uplink (UL) Timing Advance (TA), a processing duration of the network device, or a preset first duration for a round-trip transmission of messages between the terminal device and the network device.

9. The terminal device of claim 8, wherein the first parameter is sent to the terminal device by the network device through at least one of: System Information (SI), or a Radio Resource Control (RRC) signaling.

10. The terminal device of claim 8, wherein the first timer is determined according to the processing duration of the network device and the first duration.

11. A network device, comprising:
a memory configured to store a computer program; and
a processor;
wherein the processor is configured to execute the computer program to:
receive a first message in a random access process sent by a terminal device; and
determine a sending moment of a second message according to a target timer, the second message being a message sent by the network device in response to the first message, and a duration of the target timer being equal to a duration from a moment of completing sending the first message by the terminal device to a moment of starting monitoring the second message by the terminal device;

wherein the moment of starting monitoring the second message by the terminal device is performed after the target timer expires and before a second timer expires, and the target timer and the second timer are started by the terminal device responsive to that sending the first message is completed by the terminal device, a duration of the second timer being preset duration for which the terminal device monitors the second message and the duration of the second timer being longer than a duration of the target times; and wherein the random access process is a two-step random access process, the first message is a Message A (MSGA), and the second message is a Message B (MSGB).

12. The network device of claim 11, wherein the duration of the target timer is determined according to a first parameter; and the first parameter comprises at least one of: a first timer configured by the network device, a Discontinuous Reception (DRX) parameter, an Uplink (UL) Timing Advance (TA), a processing duration of the network device, or a first duration preset for a round-trip transmission of messages between the terminal device and the network device.

13. The network device of claim 12, wherein the processor is further configured to execute the computer program to: send the first parameter to the terminal device through at least one of: System Information (SI), or a Radio Resource Control (RRC) signaling.

14. The network device of claim 12, wherein the first timer is determined according to the processing duration of the network device and the first duration.

15. The network device of claim 12, wherein the DRX parameter comprises a duration configuration of a UL Hybrid Automatic Repeat reQuest (HARQ) Round Trip Time (RTT) timer, and the duration of the target timer is a duration of the UL HARQ RTT timer.

* * * * *